United States Patent [19]

Suzuki et al.

[11] Patent Number: 4,918,553
[45] Date of Patent: Apr. 17, 1990

[54] RECORDING/REPRODUCING APPARATUS FOR A DISK CASSETTE

[75] Inventors: Masayuki Suzuki, Tokyo; Hirokimi Iwata, Ibaragi, both of Japan

[73] Assignee: Sony Coporation, Tokyo, Japan

[21] Appl. No.: 197,287

[22] Filed: May 23, 1988

[30] Foreign Application Priority Data

May 23, 1987 [JP] Japan .............................. 62-78054[U]

[51] Int. Cl.⁴ ........................................... G11B 5/012
[52] U.S. Cl. .................................... 360/99.06; 369/258
[58] Field of Search .............. 360/99.06, 99.07, 99.08, 360/99.02–99.03, 96.5; 369/77.2, 258, 262, 270–271

[56] References Cited

U.S. PATENT DOCUMENTS

| 4,617,655 | 10/1986 | Aldenhoven | 369/77.2 X |
| 4,710,910 | 12/1987 | Ejiri | 369/77.2 X |
| 4,731,776 | 3/1988 | Ishii | 369/77.2 |
| 4,758,909 | 7/1988 | Harase | 360/99.06 X |

*Primary Examiner*—A. J. Heinz

*Attorney, Agent, or Firm*—Lewis H. Eslinger; Jay H. Maioli; Donald S. Dowden

[57] ABSTRACT

A recording/reproducing apparatus including a disk cassette rotatably accommodating a disk-like recording medium and having positioning holes at least on its one side, a holder holding the disk cassette and vertically movable to cause the disk cassette to take selectively a first position in which the medium is attached to a rotational disk drive unit or a second position spaced above the first position, a shifting unit for shifting the holder between the first position and the second position, and a locking unit for engaging with the positioning holes in the disk cassette when said holder is in the first position for positioning the disk cassette, is disclosed. According to the invention, the apparatus further includes a locking unit provided for rotation along the thickness of the disk cassette. The locking unit is rotated approximately simultaneously with termination of insertion of the disk cassette into the holder for retaining the vicinity of the positioning holes of the disk cassette for locking the disk cassette relative to the holder.

14 Claims, 13 Drawing Sheets

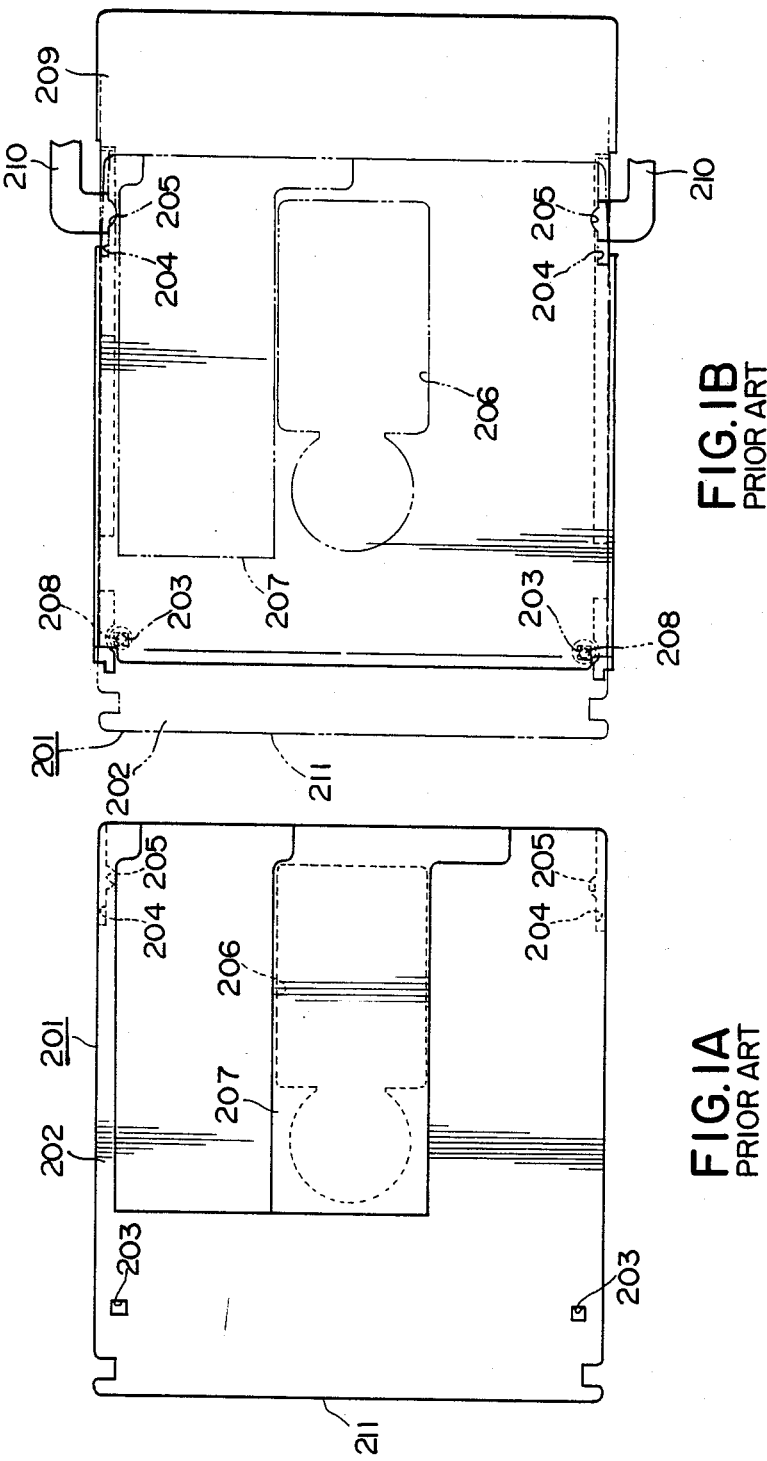

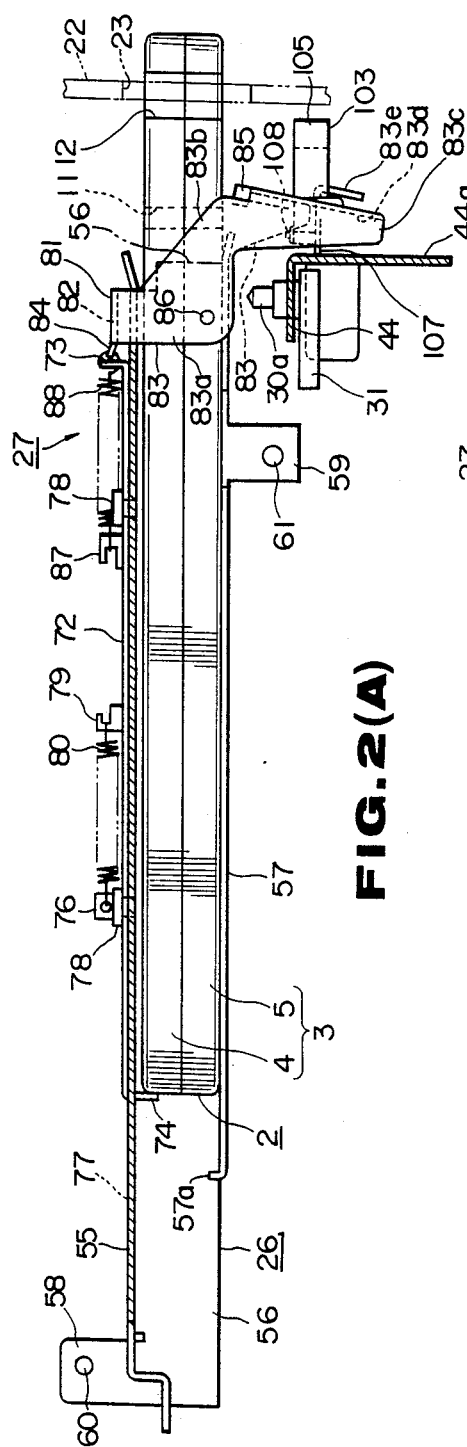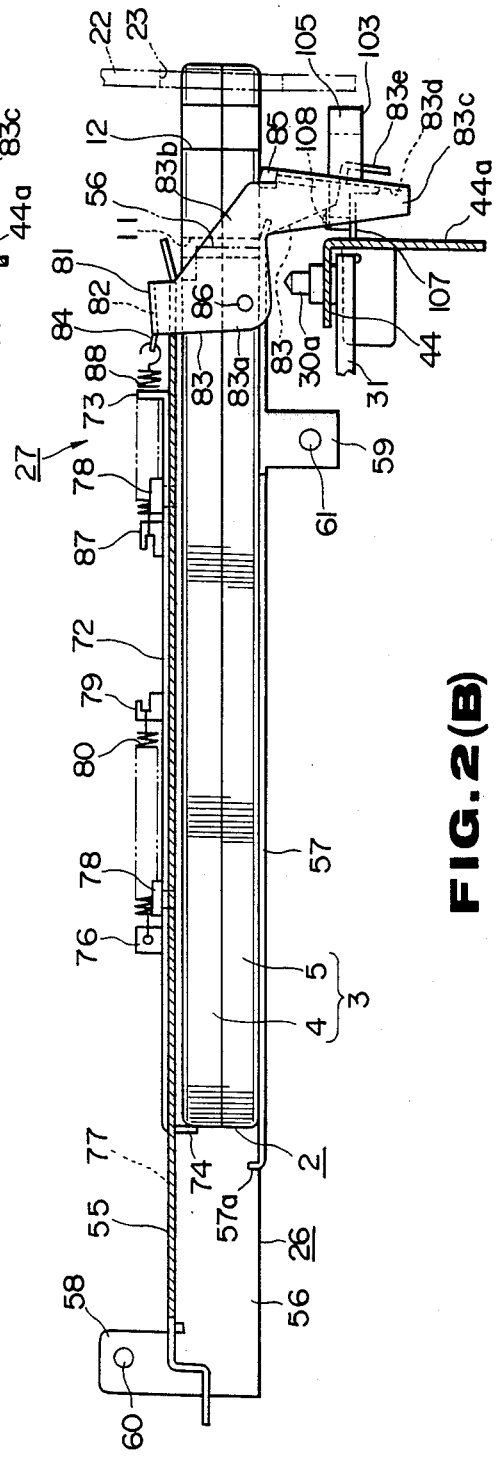

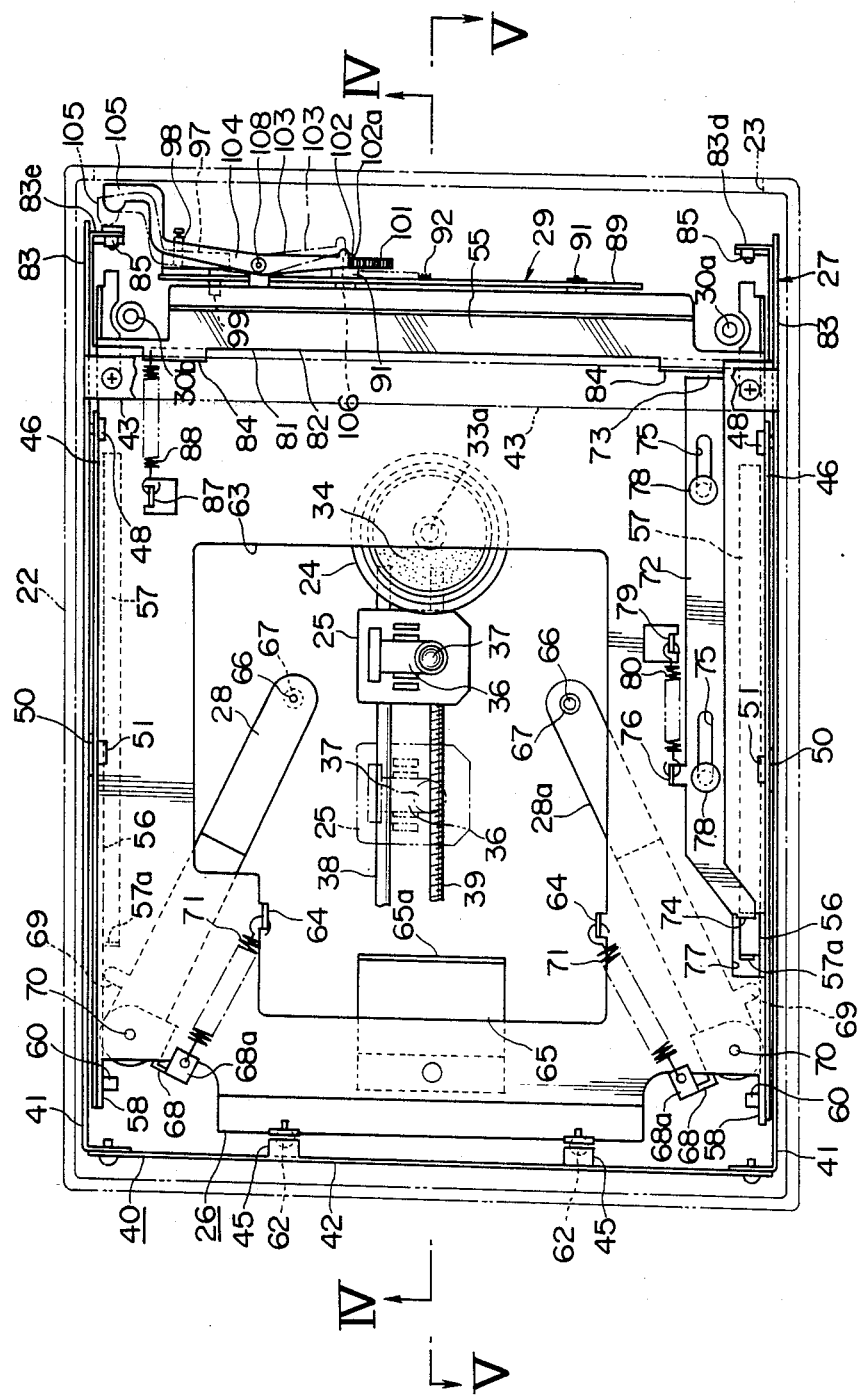

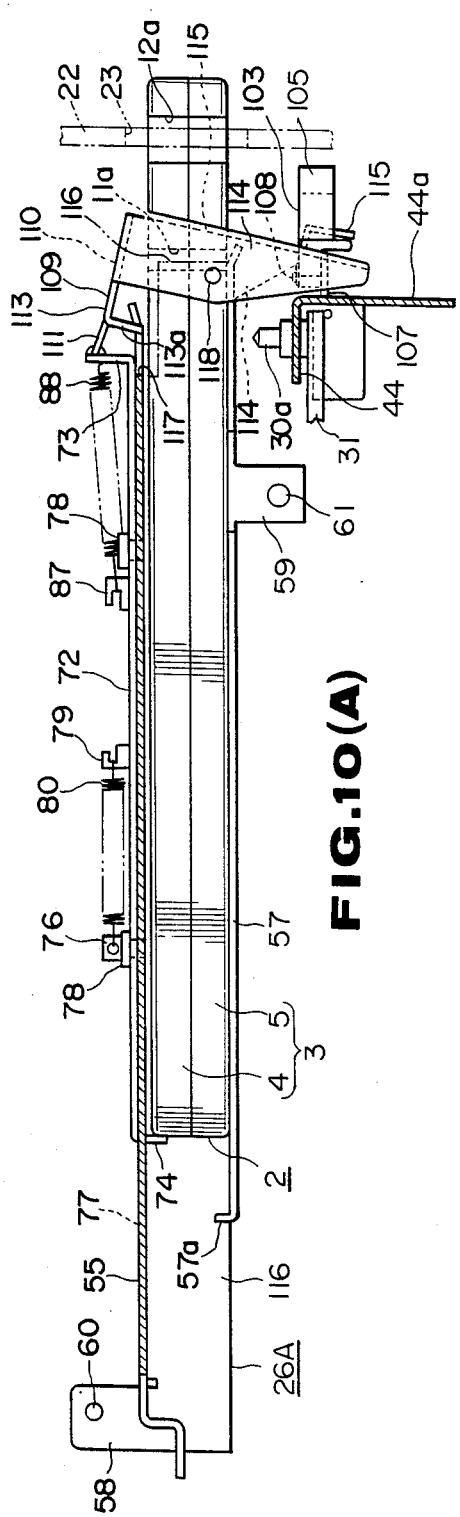
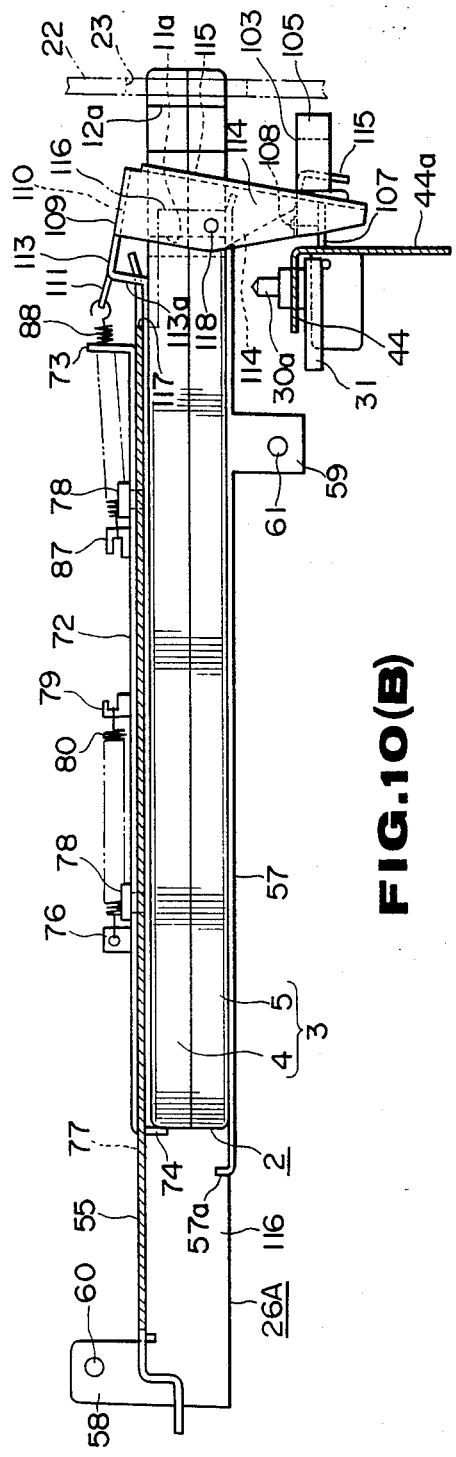
FIG.10(A)
FIG.10(B)

RECORDING/REPRODUCING APPARATUS FOR A DISK CASSETTE

BACKGROUND OF THE INVENTION

1. Field of the Invention

This invention relates to a recording/reproducing apparatus to which there is provided a disk cassette accommodating a disk, such as an optical disk, opto-magnetic disk or a magnetic disk. More particularly, it relates to such an apparatus wherein, after the disk cassette has been introduced into a predetermined position in the recording/reproducing apparatus, the disk cassette is shifted along its thickness so as to be positioned in and attached to a cassette attachment section or unit within the recording/reproducing apparatus by the positioning pins engaging in the positioning holes provided in the disk cassette.

2. Description of the Prior Art

In a recording/reproducing apparatus, it is well known that, when the disk including an optical-, an opto-magnetic or an optical disk is directly touched by hands or fingers during its attachment to or removal from the apparatus, fingerprints or the like may be deposited on the disk surface to cause errors in recording and/or reproduction. In order to prevent the disk from being touched directly by hands or fingers during handling, while preventing the dust or dirt from becoming affixed to the disk during storage, the disk is attached to the apparatus as it is accommodated in the cassette half so as to be used in this state for recording and/or reproduction. For this reason, the recording/reproducing apparatus employing this type of the disk cassette as the recording medium is provided with positioning means for positioning the disk cassette with respect to the recording/reproducing apparatus.

As such positioning means, it is known to provide one or more positioning holes in the cassette half of the disk cassette with one or more positioning pins in the cassette attachment unit or section to which the disk cassette is removably mounted, wherein the positioning pins are engaged in the positioning holes for determining the position of the disk cassette within the cassette attachment unit or section. For engaging the positioning pins in the positioning holes, the disk cassette is inserted to a predetermined position into the inside of a cassette holder, after which the cassette holder is shifted along the thickness of the disk cassette, as disclosed in U.S. Pat. No. 3,845,502.

In the recording/reproducing apparatus in which the disk cassette is positioned in the above described manner within the cassette attachment unit or section, it is necessary that, when the disk cassette is inserted to the predetermined position within the cassette holder, the positioning holes formed in the cassette half be positioned substantially coaxially with the positioning pins provided to the cassette attachment unit or section, and be maintained at such position.

To this end, some locking means are provided in the above type of the recording/reproducing apparatus for locking the disk cassette when the disk cassette is inserted to a predetermined position within the cassette holder.

FIG. 1 shows one such conventional locking means.

The locking means shown in FIG. 1 is applied to an optical disk player. A disk cassette 201 applied to the optical disk player is comprised of a rectangular cassette half 202 within which a disk-like optical disk is accommodated. At the corners on the rear side of the cassette half 202 opposite to the side to be introduced into the optical disk player, positioning holes 203, 203 are bored so as to pass through the cassette half 202 along its thickness. On both sides on the front side of the cassette half 202 introduced into the optical disk player, there are formed recesses 204, 204, at the mid portions of which engaging recesses 205, 205 are formed. A shutter 207 is provided to the cassette half 202 for opening or closing an opening 206 confronted by a recording/reproducing pickup, not shown.

Two positioning pins 208, 208 are implanted on a chassis within the optical disk player, and a cassette holder 209 is provided above the chassis. This cassette holder 209 has an inner space within which the disk cassette 201 is accommodated substantially snugly and is adapted to be movable between an eject position for insertion and removal of the optical disk cassette b and a loading end position offset from the eject position towards the interior of the apparatus proper.

On both front sides of the cassette holder 209, a pair of lock levers 210, 210 are supported for being turned horizontally.

When the disk cassette 201 is introduced into the cassette holder 209 to a prescribed inserting position shown by a double-dotted chain line in FIG. 1, the forward ends of the lock levers 210, 210 are resiliently engaged with the engaging recesses 205, 205 formed in the recesses 204, 204 of the cassette half 202. The disk cassette 201 is locked to the cassette holder 209 with a small space margin or allowance. When the cassette holder 209 is shifted from this locked position to the loading end position, the positioning pins 208, 208 are introduced into the positioning holes 203, 203 provided in the cassette half 202 for positioning in the cassette attachment unit or section.

However, the following problems are presented in the locking means for the optical disk player shown in FIG. 1.

The above described locking means are so arranged and constructed that the disk cassette introduced into the cassette holder 209 is locked with the lock levers 210, 210 laterally engaging with the engaging recesses 205, 205 formed on the lateral sides of the disk cassette 201. Thus a space for the lock levers 210, 210 need be provided laterally of the cassette holder 209, with a corresponding increase in the size of the optical disk player in a direction orthogonal to the thickness of the disk cassette 201.

On the other hand, the recording/reproducing apparatus with which the disk cassette is employed is generally standardized in its size and basic structure. With certain standards, it is occasionally not possible to provide the aforementioned space on the lateral sides of the cassette holder within the interior of the recording/reproducing apparatus, in which case the aforementioned locking means can not be installed. Even if the locking means for the cassette holder were installed in the above described manner, the operation of the locking means is necessarily limited because of the spatial constraints.

Also, in the above described locking means, the lock levers 210, 210 are engaged with the engaging recesses 205, 205 formed in the cassette case 202 for locking the disk cassette 201 to the cassette holder 209. These engaging recesses 205, 205 are markedly spaced apart from the positioning holes 203, 203 in the cassette half 202. Thus a considerable shift is caused in the relative disposition between the positioning holes 203, 203 and the positioning pins 208, 208 when the size of the cassette half 202 is changed.

Since the cassette half for this type of the disk cassette is usually formed of synthetic resin, the cassette case size would be markedly changed if the disk cassette or the recording/reproducing apparatus were placed in an environment which is vitally different from that of the ambient temperature, so that considerable changes would be caused in the distance between the engaging recesses 205, 205 of the recesses 204, 204 and the positioning holes 203, 203.

When the disk cassette 201 is locked to the cassette holder 209 with such size shift in the cassette half 202, a shift may be caused in the relative disposition between the positioning holes 203, 203 and the positioning pins 208, 208 since the position of the positioning holes 203, 203 with respect to the cassette holder 209 is shifted considerably from its proper position, although substantially no shifting is caused in the position of the engaging recesses 205, 205 with respect to that of cassette holder 209.

Therefore, in this state, insertion of the positioning pins 208, 208 into the positioning holes 203, 203 cannot be carried out smoothly. Even if such insertion were made successfully, an unduly large force would be applied at the time of such insertion onto the inner surfaces of the positioning holes 203, 203 and the positioning pins 208, 208 in a direction orthogonal to their axial direction. As a result, the cassette half 202 or the positioning pins 208, 208 would be deformed or the movement of the respective parts would be restricted thus giving rise to serious troubles. In case of excess shift, the positioning pins 208, 208 cannot be introduced into the positioning holes 203, 203.

Thus it may be contemplated that suitable locking means be engaged at the rear end face 211 of the cassette half 202 that is closest to the positioning holes 203, 203 for locking the disk cassette 201 introduced into the cassette holder 209. In such case, the locking position of the disk cassette 201 introduced into the cassette holder 109 is so close to the positioning holes 203, 203 that the positioning holes 203, 203 can be controlled to be substantially constant with respect to the cassette holder 209 under the locked condition despite changes in the size of the cassette half 202.

However, such lock means is usually provided between the cassette holder 209 and the cassette inlet provided to the recording/reproducing apparatus. The result is that the length of the recording/reproducing apparatus is increased by a space reserved for the locking means with increased difficulties in the insertion and removal of the disk cassette.

Meanwhile, the cassette half of the disk cassette is usually provided with holes or cut-outs for various purposes, such as finger guides for assisting the insertion and removal of the disk cassette into and out of the recording/reproducing apparatus, or as engagement means for the disk cassette in the automatic disk cassette supply device, these engagement means being occasionally provided in closer proximity to the aforementioned positioning holes.

BRIEF SUMMARY OF THE INVENTION

It is an object of the present invention to provide a recording/reproducing apparatus with the disk cassette as the recording medium, wherein the aforementioned disadvantages of the conventional recording/reproducing apparatus may be obviated.

It is another object of the present invention to provide a recording/reproducing apparatus wherein the disk cassette inserted into the disk attachment section within the recording/reproducing apparatus can be attached with correct positioning.

It is a further object of the present invention wherein the disk cassette attached to the disk attachment section within the recording/reproducing apparatus can be locked and positively retained by locking means.

It is a further object of the present invention to provide a recording/reproducing apparatus wherein the position matching between the positioning pins provided in the cassette attachment section and the positioning holes of the disk cassette may be realized with higher accuracy under the locking state of the locking means even if the disk cassette size should be changed for example with changes in the temperature.

It is a further object of the present invention to provide a recording/reproducing apparatus wherein the insertion and the removal of the positioning pins provided in the cassette attachment section into and out of the positioning holes in the disk cassette can be carried out safely and positively with high stability.

It is yet another object of the present invention to provide a recording/reproducing apparatus wherein the locking of the disk cassette by the locking means is effected along the thickness of the disk cassette to eliminate the necessity of providing the locking means laterally of the portion where the cassette holder is introduced, thereby to enable the locking means to be provided within the apparatus with an optimum space factor.

In accordance with the present invention, there is provided a recording/reproducing apparatus comprising a disk cassette rotatably accommodating a disk-like recording medium and having positioning holes at least on one side thereof, a holder for holding the disk cassette and vertically movable so as to cause the disk cassette to take selectively a first position in which the disk-like recording medium is attached to rotational disk-like recording means or a second position spaced above the first position, means for shifting the holder between the first position and the second position, and means for engaging with the positioning holes in the disk cassette when the holder is in the first position for positioning the disk cassette. According to the invention, the apparatus further comprises locking means provided for rotation along the thickness of the disk cassette, the locking means being rotated substantially simultaneously with termination of insertion of the disk cassette into the holder for retaining the vicinity of the positioning holes of the disk cassette for locking the disk cassette relative to the holder.

Thus, according to the present invention, the disk cassette inserted into the prescribed position within the apparatus is locked at or in the vicinity of the positioning holes of the cassette half.

These and other objects, features and advantages of the present invention will become apparent from the following detailed description of the preferred embodiments that are to be read in conjunction with the accompanying drawings, throughout which like reference numerals identify like elements and parts.

BRIEF DESCRIPTION OF THE DRAWINGS

FIGS. 1A and 1B are, respectively, diagrammatic plan views of a conventional optical disk a diagrammatic plan view showing an example of locking means in a conventional optical disk player for locking the disk cassette.

FIG. 2A is a side view showing essential parts of the optical disk player showing the locking by the locking unit of the disk cassette introduced into the cassette holder, and especially showing the disk cassette inserted into the cassette holder.

FIG. 2B is a side view showing essential parts of the optical disk player and showing the engaging member of the lock lever engaging resiliently with the bottom of the disk cassette introduced into the casssette holder.

FIG. 3 is a plan view of the optical disk player showing the cassette holder and the lock unit.

FIG. 10A is a side view showing essential parts of the other side of the optical disk player and showing the locking by the locking unit of the disk cassette introduced into the cassette holder, and especially showing the disk cassette introduced into the disk cassette.

FIG. 10B is a side view showing essential parts of the other side of the optical disk player in the state in which the engaging member of the lock lever is resiliently engaged with the bottom of the disk cassette introduced into the cassette holder.

DESCRIPTION OF THE PREFERRED EMBODIMENTS

A preferred embodiment of the present invention will be hereafter explained by referring to the accompanying drawings, wherein the present invention is applied to an optical disk player.

Figure 9:
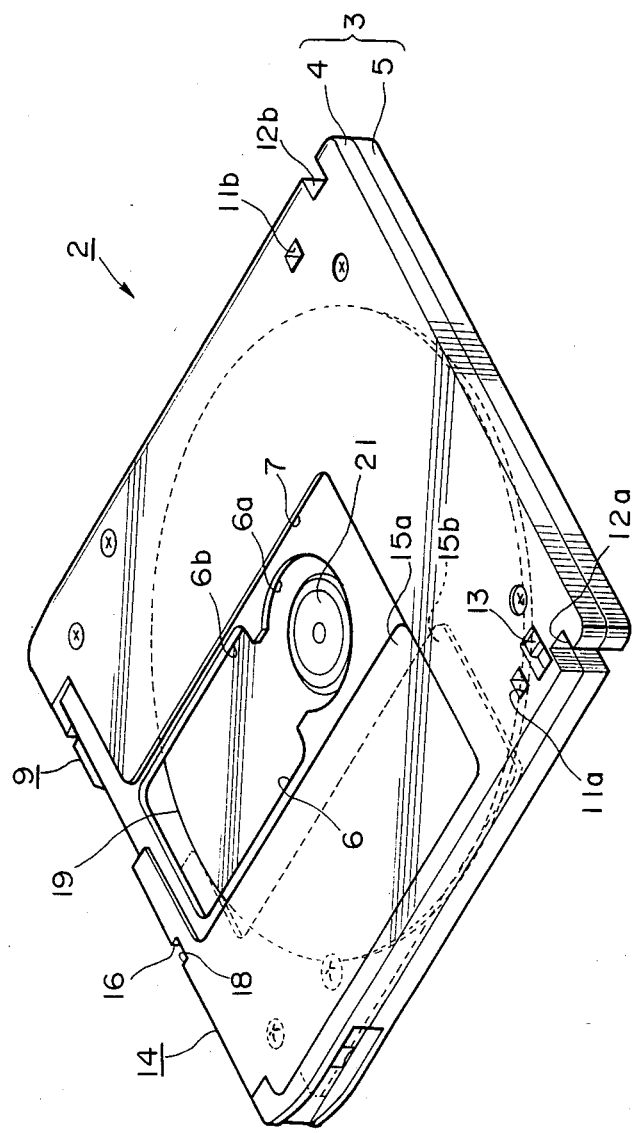
FIG. 9 is a perspective view showing an example of the disk cassette.

A disk cassette 2 applied to the disk player pertaining to the present invention is comprised, as shown in FIG. 9, of an optical disk 19 accommodated for rotation within a cassette half 3 composed of a pair of flat upper and lower halves 4 and 5 formed of synthetic material and connected to each other substantially to form a parallelpiped having a reduced thickness. On both major surfaces of the cassette half 3, there are formed window openings 6, 6 each of which is to be confronted by a pickup device adapted for recording and/or reproducing information signals to and from an optical disk 19 and into which a disk table of a rotational disk drive unit adapted for driving the optical disk 19 into rotation is inserted. These openings 6, 6 are formed extending from the center towards the forward portion of the upper and lower halves 4, 5 along their length, and are each formed by a central circular section 6a into which the disk table is inserted and a rectangular section 6b continuous to the section 6a and adapted for facing the pickup device.

Figure 8:
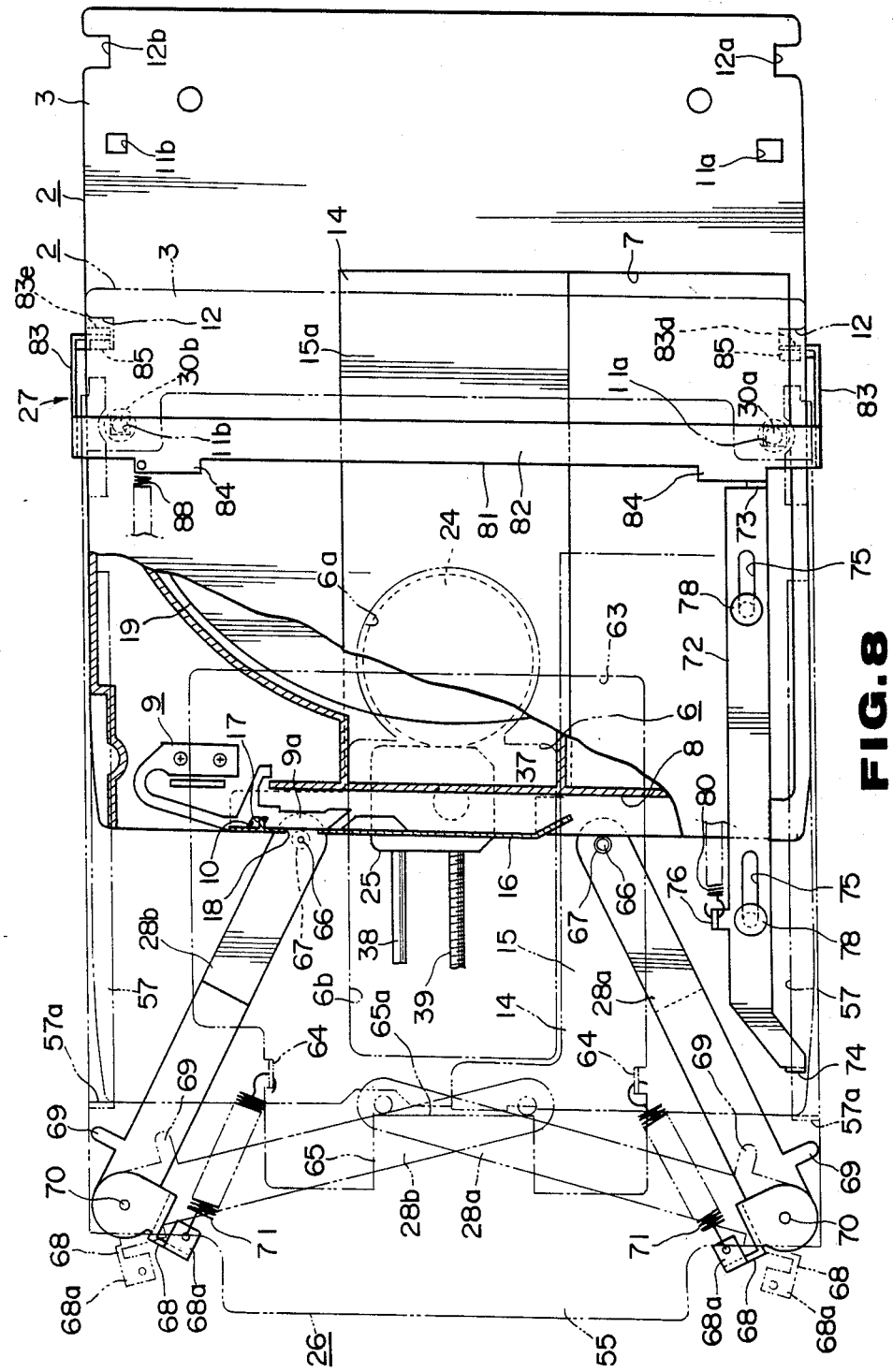
FIG. 8 is a diagrammatic plan view for understanding the operation of the shutter of the disk casssette.

The upper and lower halves 4, 5 are formed with shutter receiving recesses 7, 7 extending along one sides thereof including the periphery of the openings 6, 6. On the forward end face of the cassette half 3 is formed a groove 8 along the width of the cassette half 3, as shown in FIG. 8.

Within the cassette half 3, there is provided a shutter locking member 9 for partially extending into the groove 8. The shutter locking member 9 is formed of resilient synthetic material and, as shown in FIG. 8, has its proximal end, that is, the end disposed within the inner recess of the cassette half 3, secured to the cassette half 3. An engaging recess 10 is formed substantially at the center along the length of a resilient portion 9a running approximately parallel to the lengthwise direction of the groove 8. The resilient portion 9a is maintained so that, when it is not thrusted in a direction towards the inner recess of the cassette half 3, that is, in the unlocking direction, one lateral side of the portion 9a is disposed approximately on the opening side of the groove 8.

At the corners of the rear end face of the cassette half 3 opposite to the forward side formed with the groove 8, a pair of positioning holes 11a, 11b are formed, as shown in FIG. 9. These positioning holes 11a, 11b are substantially rectangular in contour when looking along the thickness of the disk cassette 2, and are formed through the cassette 3 along its thickness. On both sides on the rear end face of the cassette half 3, a pair of engaging recesses 12a, 12b are formed. These engaging recesses 12a, 12b are of substantially U shaped opening in the opposite directions to each other, when looking along the thickness of the disk cassette 2 and are positioned in the vicinity of the positioning holes 11a, 11b.

These engaging recesses 12a, 12b are adapted to be engaged with cassette take-out members of on automatic supply device adapted in turn for taking out a disk cassette 2 from a cabinet or rack containing a large number of the disk cassettes 2 or from the optical disk player. The automatic supply device is adapted for automatically supplying and taking out the disk cassettes 2 to and from the disk player.

A mistaken erasure inhibit member 13 is provided in the vicinity of one of the positioning holes 11a. When the signal recording surface is formed on each side of the optical disk 19, the inhibit member 13 is formed on each of the upper and lower cassette halves 4 and 5.

A shutter 14 having a U-shaped cross section is movably mounted to the above described cassette half 3 for opening and closing the window openings 6. The shutter 14 is comprised of a pair of closure sections 15a, 15b for closing the openings 6 and a connecting section 16 interconnecting these closure sections 15a, 15b. An engaging piece 17 for engaging with an engaging recess 10 of the shutter lock member 9 is formed on the connecting section 16, as shown in FIG. 8, and a recess 18 is formed in proximity to the engaging piece 17.

The shutter 14 is supported by the cassette half 3 for sliding along its width with the closure sections 15a, 15b located within shutter accommodating recesses 7, 7 formed in the cassette half 3. When the shutter 14 is positioned for closing the openings 6, 6 of the cassette half 3, it is prevented from being shifted from the closure position by the engaging piece 17 engaging within the engaging recess 10 of the locking member 9. The aforementioned locking state of the shutter 14 is released by a resilient portion 9a of the locking member 9 being thrust in the unlocking direction. The shutter may be moved to a position opening the window openings 6, 6 when the shutter is thrust from such unlocked state in a direction of opening the window opening 6, 6.

It will be noted that, with the shutter 14 in the closure position, the recess 18 formed in the connecting section 16 is positioned for facing to the forward end of the resilient portion 9a of the locking member 9.

The optical disk 19, rotatably accommodated within the cassette half 3, has signal recording surfaces on its both sides, and is provided with a substantially disk-shaped central suction plate 21 formed of a magnetic material.

The optical disk 19 is accommodated for rotation within the cassette half 3, with the suction plate 21 facing to the circular section 6a of the opening 6 of the cassette half 3.

When the shutter 14 is moved to its opening position, a portion of the optical disk 19, that is, a portion of the signal recording surface and the periphery of the disk 19 inclusive of the suction plate 21, is confronted towards the outside of the cassette half 3.

The optical disk player, to which the above described disk cassette 2 is mounted, will be hereafter explained.

As shown in FIGS. 2 and 3, the optical disk player is comprised of an outer casing 22 forming the main body. An elongated cassette inlet opening 23 is transversely formed on the upper front surface portion of the casing 22.

Within the interior of the optical disk player 1, there are provided a rotational disk drive device provided with a disk table 24 to which the optical disk 19 is mounted detachably, a reproducing section including an optical pickup device for reading the signals recorded on the disk 19 and an associated circuit, not shown, and a cassette loading section including a cassette holder 26 into which the disk cassette 2 is loaded removably, a locking unit 27 for locking the optical disk cassette 2 inserted to the prescribed position within the cassette holder 26, a pair of shutter opening levers 28, 28 for opening the shutter 14 of the disk cassette 2 and a lift unit 29 adapted for vertically shifting the cassette holder 26.

When the disk cassette 2 introduced into the casing 22 through inlet 23 is introduced to the predetermined position within the cassette holder 26, it is locked to the cassette holder 26 by the locking unit 27. As the disk cassette is introduced into the cassette holder 26, the shutter 14 is moved by the shutter opening levers 28a or 28b to its opening position to open the windows 6, 6. The cassette holder 26 is then caused to descend by the lift unit 29 until the disk cassette 2 is attached to the cassette attachment section. At this time, the positioning pins 30, 30 provided to the chassis are introduced into the positioning holes 11a, 11b of the cassette half 3 for positioning the disk cassette 2 relative to the reproducing section. Substantially at the same time that the disk cassette 2 is attached to the cassette attachment section, the suction plate 21 of the optical disk 19 is attracted by a magnet 34 provided at the center of the disk table 24 and the unrecorded inner peripheral portion of the optical disk 19 is supported by a disk supporting outer peripheral portion of the disk table 24, so that the disk 19 is attached to the disk table 24. The optical pickup device 25 faces the signal recording surface of the optical disk 19. As the disk table 24 is turned from this state, the optical disk 19 is turned in unison therewith, and a laser beam from the pickup device 25 falls on the surface of the optical disk 19 for reading or recording signals from or on the disk 19.

Figure 4:
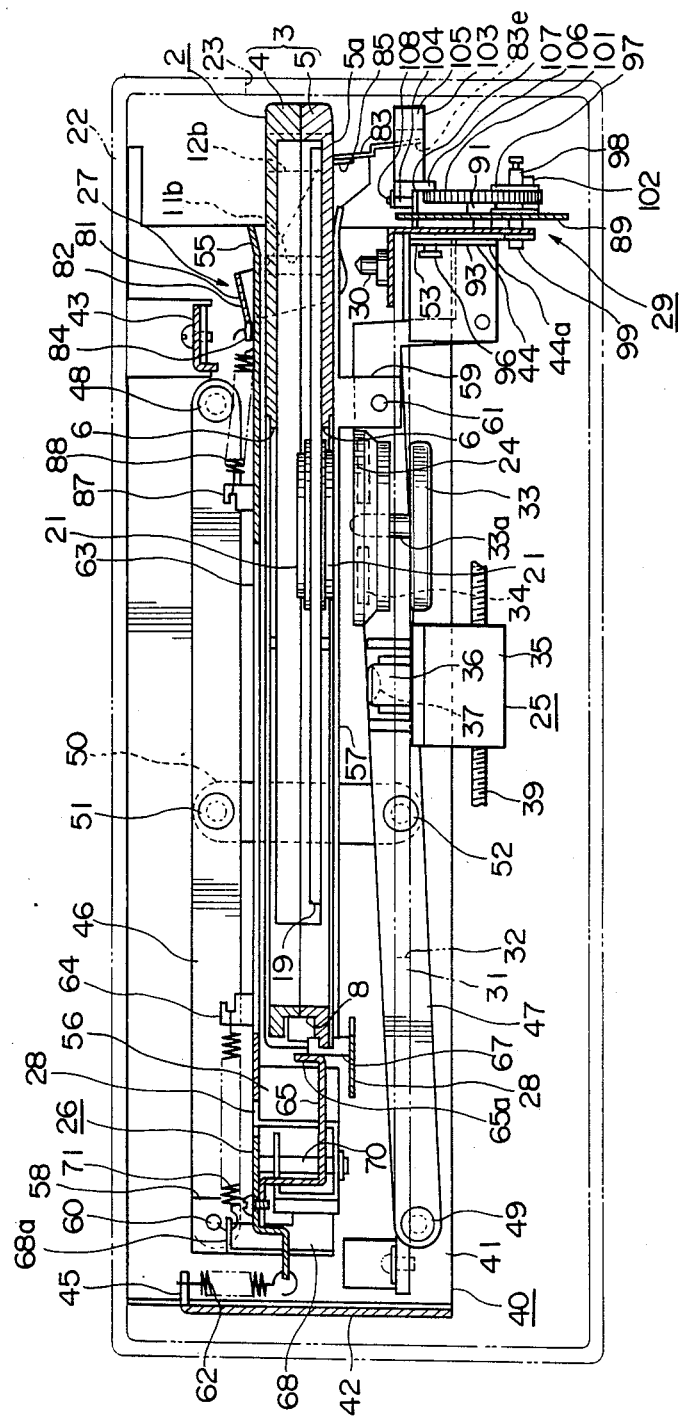
FIG. 4 is a sectional view along line IV—IV of FIG. 3 and showing the disk cassette introduced into the cassette holder at the eject position.

A chassis 31 is disposed within the outer casing 22 and positioning pins 30a, 30b are mounted to the transverse sides on the forward end of the chassis 31 for protruding upwards, while a larger opening 32 is formed, as shown in FIG. 4.

An electric motor 33 for rotationally driving the disk is provided to the lower surface of the chassis 31 with a rotary shaft 33a thereof projecting above the chassis 31 through the opening 32. The disk table 24 is secured to the rotary shaft 33a.

The disk table 24 is in the form of an axially extending cylinder of a short length opened at the top and a magnet 34 is disposed within the interior thereof.

The optical pickup device 25 is formed by an optical block enclosing a laser source or optical elements, and a biaxial driving member 36 supported on the upper surface of the optical block 35. An object lens 37 is attached to the upper end of the biaxial driving member 36 so that the laser beam emitted from the laser source is conducted via an optical system so as to be projected above the object lens 37, that is perpendicularly towards the optical disk 19.

As shown in FIG. 3, a guide shaft 38 and a screw shaft 39 are provided below the chassis 31 and parallel to each other, with the optical pickup device 25 being supported so as to be movable forward and backward along the guide shaft 38 and the screw shaft 39. The optical pickup device 25 is shifted in the left and right direction in FIG. 3 or in the forward and backward direction by the screw shaft 39 being revolved by an electric motor not shown.

To the chassis 31 is mounted a frame 40 constituting a cassette loading section. The frame 40 is comprised of a pair of side plates 41, 41 a rear plate 42 interconnecting the rear portions of these side plates 41, 41, a rod 43 interconnecting the upper forward ends of the side plates 41, 41, and a front plate 44 having an L-shaped cross-section and adapted for interconnecting the lower ends of the forward edges of the side plates 41, 41. The frame 40 is opened on the major portions of the upper, lower and front sides.

On the inner sides of the side plates 41, 41 of the frame 40, supporting arms 46, 47; 46, 47 are supported for vertically movably supporting the cassette holder 26. These supporting arms 46, 47; 46, 47 are formed as elongated plates having approximately the same length in the forward and backward direction. The forward ends of the upper supporting arms 46, 46 are rotatably supported by shafts 48, 48 at the positions close to the upper edge at the forward ends of the side plates 41, 41 of the frame 40, while the rear ends of the lower supporting arms 47, 47 are rotatably supported by shafts 49, 49 at the positions close to the lower edge towards the rear ends of the side plates 41, 41. The upper and lower supporting arms 46, 46; 47, 47 are rotatably connected at about the mid portions by the upper and lower ends of the connecting pieces 50, 50 by pins 51, 52; 51, 52.

These supporting arms 46, 47; 46, 47 are supported so as to be rotatable substantially vertically, while the respective rotary ends are adapted to be shifted vertically in synchronism with each other.

Figure 6:
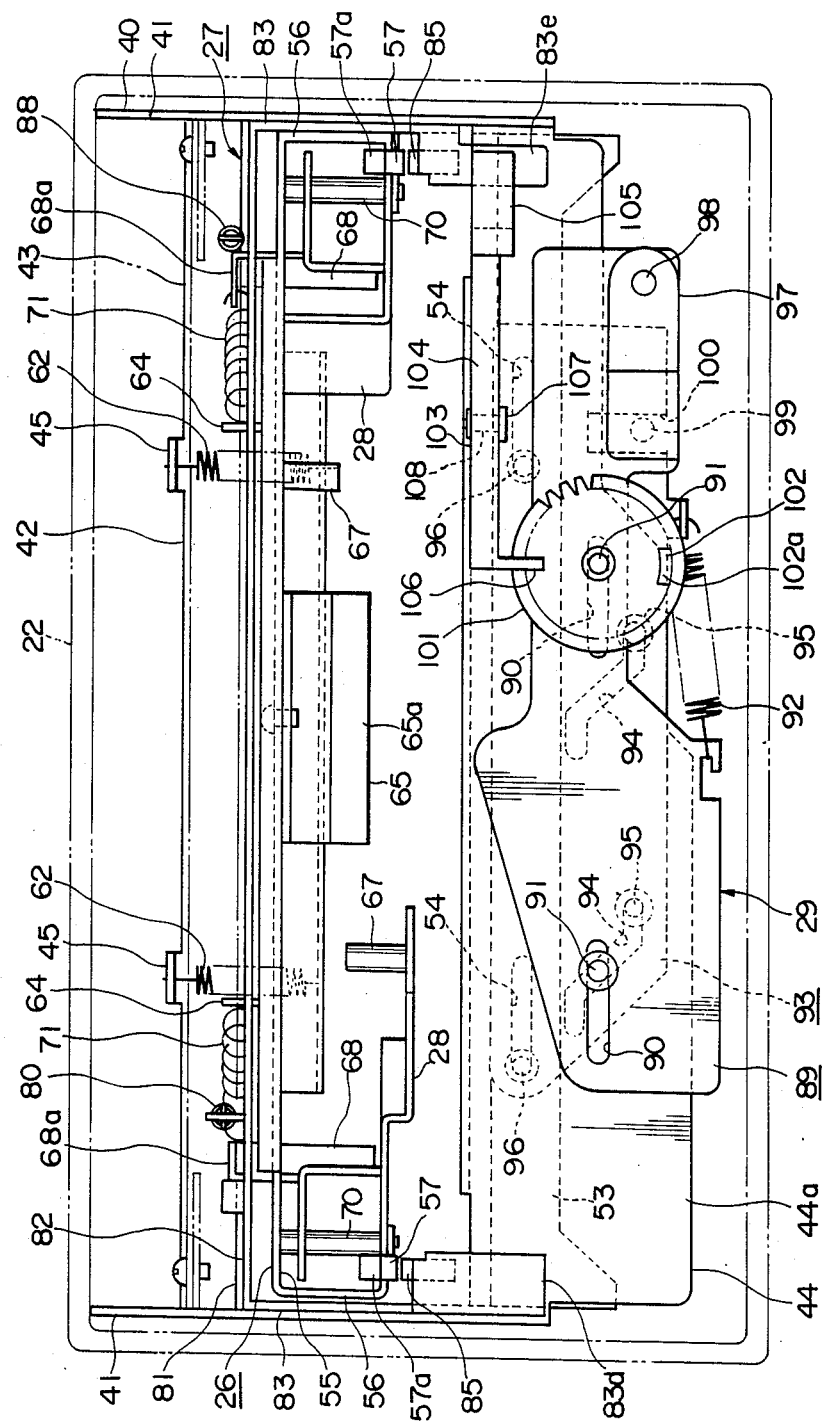
FIG. 6 is a front view of the optical disk player showing the cassette holder and the lock unit.

A connecting plate 53 is secured to the forward ends of the lower supporting arms 47, 47 at the left and right side ends and substantially in contact with the upper ends of the inner surface of a lower piece 44a of the front plate 44. Engaging elongated holes 54, 54, FIG. 6, are formed in the left and right direction and at two spaced apart positions of the connecting plate 53.

The cassette holder 26 is formed substantially in the form of an inverted letter U by a ceiling plate 55 which has the form of a rectangle slightly less than the plan contour of the frame 40 and left and right side walls 56, 56 projecting downward from both side edges of the ceiling plate 55. Bottom pieces 57, 57 interrupted at several points are projectedly mounted from the lower edge of the side walls 56, 56 towards facing sides. The interval between the bottom pieces 57, 57 and the ceiling plate 55 is selected so as to be substantially equal to the thickness of the disk cassette 2.

The rear ends of the bottom pieces 57, 57 are formed with control pieces 57a, 57a and the two corners on the front side of the ceiling plate 55 are cut out in the form of a letter U.

Projecting pieces 58, 58 are projectedly formed on the rear upper edges of the side walls 56, 56, while projecting pieces 59, 59 are projected down from the lower front ends. The upper ends of the rear side projecting pieces 58, 58 are rotatably connected to the rotatory ends of the upper supporting arms 46, 46 by pins 60, 60, while the lower ends of the front side projecting pieces 59, 59 are rotatably connected to the rotary ends of the lower supporting arms 57, 57 by pins 61, 61.

Thus the cassette holder 26 is supported by left and right side pairs of the supporting arms 46, 47; 46, 47 to the frame 40 for movement vertically, and the vertical movement of the cassette holder is performed at all times in the horizontal position.

Two tension springs 62, 62 are provided under tension between spring retainers 45, 45 provided to the rear plate 42 and the rear end of the ceiling plate 55 of the cassette holder 26, such that the cassette holder 26 is perpetually biased in the upward direction under the tensile force of the tension springs 62, 62.

Figure 5:
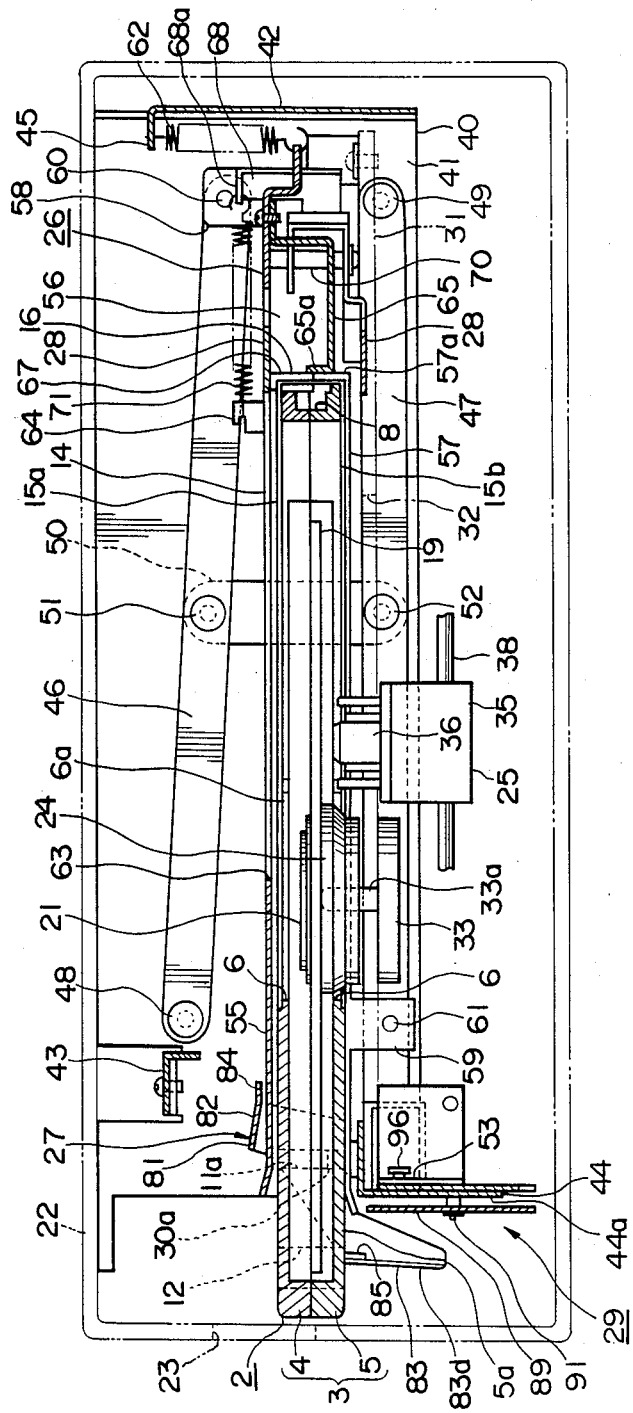
FIG. 5 is a sectional view along line V—V of FIG. 3 and showing the state in which the disk cassette is attached to the cassette attachment section.

The cassette holder 26 is moved vertically by the lift unit 29 between an eject position at substantially the same height level as the cassette inlet 23 of the outer casing 22 as shown in FIG. 5 and a loading complete position at a slightly lower height level than said eject position as shown in FIG. 5.

A pair of shutter opening levers 28a, 28b are provided as shown in FIG. 3 for facing to the inner side of the outer casing 2, or the forward end of the disk cassette 2 inserted into the cassette holder 26. These shutter opening levers 28a, 28b are in the form of plates elongated in substantially the forward and backward direction when viewed from above. These levers are bent at substantially the mid portions along their length in the form of cranks when viewed from lateral sides so that the forward ends of the left and right shutter opening levers 28a, 28b are at different height levels. A shaft 66 is projected above and from the forward end of the shutter opening lever 28a, while a shaft 66 is projected below and from the forward end of the other lever 28b. Pressure rolls 67, 67 are rotatably supported by these shafts 66, 66.

The rear ends of the shutter opening levers 28a, 29b are substantially in the form of a letter U when viewed along the length thereof.

Spring retainers 68, 68 are projectedly mounted from the rear edges of the rear ends of the shutter opening levers 28a, 28b, with the upper ends thereof reaching a position slightly higher than the ceiling plate 55 of the cassette holder 26. Spring retainers 68a, 68a are provided to these upper ends.

The numeral 69, 69 identifies stop members projecting outwards from the rear ends of the shutter opening levers 28a, 28b.

The shutter opening levers 28a, 28b are mounted for rotation by supporting shafts 70, 70 implanted on both rear sides of the ceiling plate 55 of the cassette holder 26 in a depending manner. These shutter opening levers 28a, 28b are biased into rotation by tension springs 71, 71 installed under tension between the spring retainers 68a, 68a and the ceiling plate 55 of the cassette holder 26. The one shutter opening lever 28a is perpetually biased into clockwise rotation in FIG. 3 under the tensile force of the spring 71, while the other shutter opening lever 28b is perpetually biased into counterclockwise rotation in FIG. 3 under the tensile force of the tension spring 71. The former lever 28a is inhibited from further clockwise rotation by the stop member 69 abutting on the lower rear end of the left side wall 56 of the cassette holder 26 under the condition in which the lever 28a is not subjected to a pressure biasing the lever into counterclockwise rotation. The latter lever 28b, on the other hand, is inhibited from further counterclockwise rotation with the stop member 69 abutting on the lower rear end of the right side wall 56 of the cassette holder 26 under the condition that the lever is not subjected to a force biasing it into clockwise rotation.

The shutter opening lever 28a is maintained, when it is not thrusted counterclockwise, at a position in which, as shown in FIG. 3, the pressure roller 67 is shifted to a position slightly towards the left of the center of the cassette holder 26, referred to hereafter as the standby position for the lever 28a. Similarly, the shutter opening lever 28b is maintained, when it is not thrusted clockwise, at a position in which, as shown in FIG. 3, the pressure roller 67 is shifted to a position slightly towards the right of the center of the cassette holder 26, referred to hereafter as the standby position for the lever 28b.

The disk cassette 2 is loaded into the cassette holder 26 and the shutter 14 is moved to the opening position by the shutter opening levers 28a, 28b, in the following manner.

It will be noted that the optical disk 2 is in a direction in which the signal recording surface is directed down, referred to hereafter in the first direction, when the disk cassette is introduced into the casing 22 with the side of the locking member 9 directing inward. The direction along the disk thickness in which the one signal recording surface of the disk 19 is read is referred to as the first direction. The direction is the reverse of the first direction when the other signal recording surface is read, this direction being referred to as the second direction.

When the disk cassette 2 is introduced through the inlet 23 into the casing 22 from the state in which the cassette holder 26 is at the aforementioned eject position, and the cassette reaches the mid position, the pressure rollers 67, 67 of the shutter release levers 28a, 28b abut on the forward end face of the cassette half 3 of the disk cassette 2.

When the disk cassette 2 is introduced into the cassette holder 26 in the first direction, the pressure roller 67 of the one shutter opening lever 28 located towards left when looking from the inserting side of the disk cassette 2 abuts on the forward end of the resilient portion 9a of the locking member 9 through the recess 18 of the connecting section 16 of the shutter 14 to thrust the forward end in the unlocking direction. When the disk cassette 2 is introduced into the cassette holder 21 in the second direction, the pressure roller 67 of the other shutter opening lever 28b located towards the right when viewed from the inserting side of the disk cassette 2 abuts on the forward end of the resilient portion 9a of the locking member 9, see FIG. 8, for thrusting the forward end in the unlocking direction, so that the locking of the shutter 14 by the locking member 9 is released.

When the disk cassette 2 is introduced further into the inside of the cassette holder 26, the cassette half 3 thrusts the left pressure roller, with the shutter opening levers 28a, 28b being turned counterclockwise and clockwise, respectively. At this time, one of the pressure rollers disposed within the recess 18 of the shutter 14 is moved as it thrusts the side edge of the recess 18 laterally, so that the shutter 14 is shifted towards its open position.

Substantially at the same time that the shutter 14 reaches the open position, as shown by the double dotted chain line in FIG. 8, the pressure roller 67 abuts on the forward end 65a of an abutment 65 provided to the cassette holder 26 so that rotation of the respective shutter opening levers 28a, 28b are inhibited. Simultaneously, the cassette half 3 abuts on control members 57a, 57a of the bottom pieces 57, 57 of the cassette holder 26. In this state, the disk cassette 2 is completely introduced in position into the cassette holder 26.

It will be noted that, when the disk cassette 2 is inserted in position within the cassette holder 26, engaging members of the locking unit 27 as later described are engaged with the engaging recesses 12a, 12b formed in the cassette casing 3 to inhibit forward movement of the disk cassette 2. In this manner, the disk cassette 2 is locked to the casssete holder 26.

Figure 7:
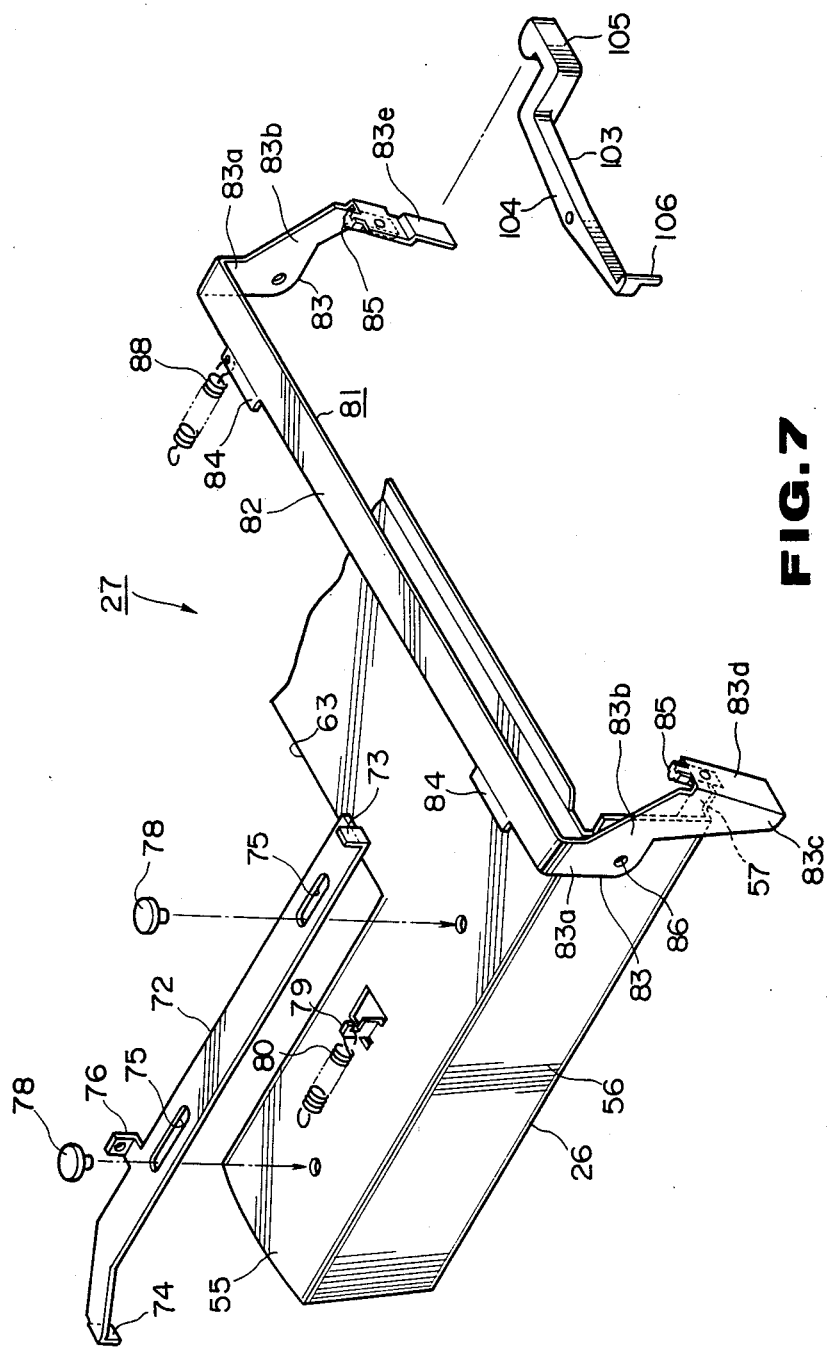
FIG. 7 is an exploded perspective view showing the lock unit.

As shown in FIG. 7, the locking unit 27 is comprised of a locking lever 81 supported so as to be turned substantially vertically, that is, substantially in the same direction as the thickness of the disk cassette 2 introduced into the cassette holder 26, a tension spring 88 and a stop slider 72 controlling the position of the lock lever 81.

The stop slider 72 of the locking unit 27 is formed as an elongated plate in the forward and backward direction and has an upright stop member 73 and a downwardly projecting thrust member 74 at the forward and rear ends thereof, respectively. With the thrust member 74 of the stop slider 72 projecting down through the ceiling plate 55 through an elongated opening 77 formed at the rearward side of the ceiling plate 55, the guide pins 78, 78 implanted on the ceiling plate 55 are engaged in the elongated openings 75, 75 having the long axes extending longitudinally, so that the stop slider is supported by the ceiling plate 55 of the cassette holder 26 so as to be movable within the predetermined extent in the forward and backward direction. The tension spring 80 is mounted under tension between the spring retainers 79 provided to the ceiling plate 55 and the spring retainer 76 provided to the rear lateral side of the stop slider.

Thus the stop slider 72 is perpetually biased into forward movement by the tension spring 80. Unless it is biased rearwardly, the rear edges of the elongated openings 75, 75 abut on the guide pins 78, 78 so that they are maintained at the position shown in FIG. 3, hereafter referred to as the forward position. With the stop slider 72 at the forward position, the stop member 73 is positioned substantially below the rod 43 of the chassis 40. The lock lever 81 is integrally formed by a connecting rod 82 in the form of a plate elongated in the left and right direction with a length about equal to the length in the left and right direction of the cassette holder 26 and a pair of arms 83, 83 extending substantially downwardly from the left and right ends of the connecting rod 82. A pair of projecting members 84, 84 are formed towards the left and right ends of the connecting rod 82 for projecting rearwardly and obliquely upwardly.

It will be noted that one of these two projecting members 84, 84 that is positioned towards the left in FIG. 7, hereafter referred to as an abutment portion, is the portion that abuts on the stop member 73 of the stop slider 72. The projecting member 84 towards the right in FIG. 7, hereafter referred to as the spring retainer, is the portion engaging with one end of the tension spring, as later described.

A pair of arms 83, 83 are crank-shaped when viewed in the left and right direction. The one arm 83 towards the left in FIG. 7 is integrally formed by an upper portion 83a extending down vertically from the left end of the rod 83, an intermediate portion 83b extending from the lower end of the upper portion 83a forwardly and slightly obliquely downwardly, a lower portion 83c extending from the forward end of the portion 83b downwardly and slightly obliquely downwardly, and a vertically elongated rectangular engaging portion 83d projecting from the forward edge of the lower member 83c towards the right. The other arm 83 towards the right in FIG. 7 is integrally formed by an upper portion 83a and an intermediate portion 83b similar in profile to the upper portion 83a and the intermediate portion 83b of the one arm 83, and an engaging portion 83e elongated vertically and having the upper end continuing with the forward end of the intermediate piece 83b.

The upper ends of the respective engaging pieces 83d, 83e of the left and right arms 83, 83 are of narrow width and approximately at the same height level. To the rear sides of these arms are affixed engaging members 85, 85 of a smaller size formed of synthetic resin.

The lock lever 81 is so arranged that, with the connecting rod 82 positioned at a distance from the upper surface of the forward end of the ceiling plate 55 of the cassette holder 26, the connecting portions between the upper portions 83a, 83a and the intermediate portions 83b, 83b of the left and right arms 83, 83 are rotatably supported by supporting shafts 86, 86 at the forwards ends of the left and right side walls 56, 56 of the cassette holder 26.

A spring retainer 87 is integrally formed at a position of the ceiling plate 55 of the cassette holder 26 rearwardly spaced apart from the spring retainer 84 of the lock lever 81, and a tension spring 88 is provided between the spring retainer 87 and the spring retainer 84 of the lock lever 81. The tension spring 88 is selected so as to have a spring force weaker than that of the tension spring 80 biasing the stop slider 72 towards a forward movement.

Thus the lock lever 81 is pulled rearwardly and slightly downwardly by the spring 88 until its spring retainer 84 is close to the ceiling plate 55 of the cassette holder 26 so that the force of counterclock rotation in FIG. 2 is afforded to the lock lever 81 until the lock lever 81 assumes the above position, hereafter referred to as the locking position, while it is maintained at the locking position when it arrives at such position.

When the stop slider 72 is at the aforementioned forward position, its abutment 84 abuts on the stop member 73 of the stop slider 72 from the forward side, so that, as shown in FIG. 2A, the lock lever 81 is maintained at a position in which their engaging members 85, 85 are at a height slightly lower than the bottom pieces 57, 57 of the casssette holder 26, hereafter referred to as an non-locking position.

When the stop slider 72 is at the forward position, the lock lever 81 is maintained at the non-locking position. When the stop slider 72 is shifted towards the rear from the forward position, the lock lever 81 is shifted to a locking position, under the tensile force of the tension spring 88. When the lock lever is at the locking position, the engaging members 85, 85 are at a height level higher than the bottom pieces 57, 57 of the cassette holder 26.

The optical disk cassette 2 is locked to the cassette holder 26 by the above described locking unit 27 in the following manner.

When the optical disk cassette 2 is inserted into the cassette holder 26, the cassette casing 3 abuts on the pressure rollers 67, 67 of the shutter opening levers 28, 28. As the disk cassette 2 is further inserted, the left end of the cassette casing 2 abuts on the thrust piece 74 of the stop slider 72, as shown in FIG. 2A to thrust the thrust member 74 rearwards.

This causes the stop slider 72 to be moved rearwards from the forward position, so that the stop member 73 is receded rearwards from the abutment portion 84 of the locking lever 81. This causes the lock lever 81 to be turned counterclockwise to cause the engaging members 85, 85 thereof to abut resiliently on the bottom of the cassette half 3 from the underside, as shown in FIG. 2B.

Figure 2C:
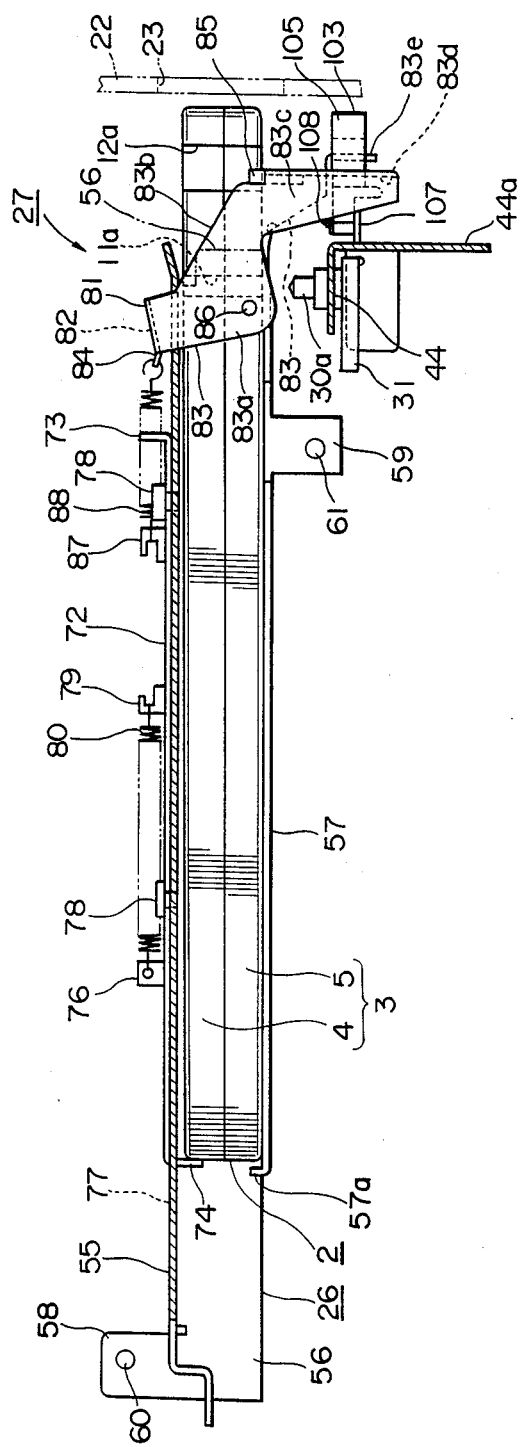
FIG. 2C is a side view showing essential parts of the optical disk player and showing the engaging member of the locking lever engaging in the engaging recess of the disk cassette introduced into the cassette holder.

The disk cassette 2 is further thrust rearwards from this state. At substantially the same time that the cassette half 3 abuts on the control pieces 57a, 57a provided on the rear ends of the bottom pieces 57, 57 of the cassette holder 26, the engaging recesses 12a, 12b formed in the cassette casing 3 are positioned to overlie the engaging members 85, 85 of the locking lever 81, so that the locking lever 81 is turned further counterclockwise until the engaging members 85, 85 are engaged from the underside with the engaging recesses 12, 12, as shown in FIG. 2c.

At substantially the same time that the disk cassette 2 introduced into the cassette holder 26 reaches the preset inserted position within the cassette holder 26, the engaging members 85, 85 of the locking lever 81 are engaged from the underside with the engaging recesses 12, 12 formed in the cassette casing 3, so that the movement of the disk cassette 2 in the forward and backward direction is inhibited. On the other hand, rearward movement of the disk cassette is also controlled by the control members 57a, 57a of the bottom members 57, 57 whereby it is locked to the cassette holder 26. At this time, the positioning holes 11a, 11b are positioned directly above the positioning pins 30a, 30b.

The locking of the disk cassette 2 by the locking lever 81 is released by the unlocking lever as later described.

The lift unit for vertically shifting the cassette holder 26 into which the disk cassette 2 is inserted and accommodated will be explained. As shown in FIG. 6, the lift unit includes a first slider 89 and a second slider 93. The first slider 89 is supported for movement within a predetermined distance in the left and right direction by the guide pins 91, 91 projecting from the front side of the lower piece 44a of the front plate 44 of the chassis 40 slidably engaging in the elongated holes 90, 90 formed in the slider plate 89 having their longer axes extending in the longitudinal direction. The second slider 93 is perpetually biased towards the left in FIG. 6 under the tension of the tension spring 92 provided between it and the first slider 89. The second slider 93 is formed with cam grooves 94, 94 spaced from each other in the left and right direction. In these cam grooves 94, 94 are slidably engaged guide pins 95, 95 projecting rearwardly from the lower end of the lower piece 44a of the front plate 44 of the chassis 40.

When viewed from the forward side, the cam grooves 94, 94 are extended down toward the right at approximately 45° relative to the vertical direction, such that the second slider is shifted downwards or upwards when it is moved towards the right or left, respecitvely.

Connecting pins 96, 96 are projected towards the rear from the upper end of the second slider 93, these connecting pins 96, 96 being slidably engaged in the engaging elongated slots 54, 54 formed in the connecting plate 53 interconnecting the forward ends of the lower supporting arms 47, 47.

Thus, when the second slider 93 is shifted towards the right, the connecting plate 53 is thrust down so that the supporting arms 47, 47 are turned clockwise in FIG. 4 to shift the cassette holder 26 downwards. When the second slider 93 is shifted towards the left, the connecting plate 53 is thrusted in the upward direction, so that the supporting arms 47, 47 are turned counterclockwise in FIG. 4 for lifting the cassette holder 26.

The first slider 89 and the second slider 93 are connected by connector 97 for movement integrally. The right-side end of the connector 97 is connected to a connecting pin 98 projectingly formed from the right side end of the first slider 89, while the rear end of the pin 99 projectingly provided from the left end towards the rear is slidably vertically engaged in a recess 100 formed towards the lower right side edge of the second slider 93, whereby the sliders 89, 93 are connected to each other for movement integrally in the left and right direction.

A cam gear 101 is rotatably supported at the forward end of a guide pin 91 which is adapted to support the first slider 89 and is located towards right in FIG. 6. A cam projection 102 is formed on the front side of the cam gear 101 in the vicinity of the deddendum circle.

This cam projection 102 has the shape of a rectangular triangle when viewed from above.

An unlocking lever 103 is carried for rotation by a pin 108 mounted on a supporting member 107 projecting forwards from the upper end of the lower member 44a of the front plate 44 of the frame 40. As shown in FIG. 7, the unlocking lever 103 is formed integrally from an elongated main portion 104 along the left and right direction, a thrusting portion 105 continuous from the right side end of the main portion 104 and in the shape of a letter U when viewed from above, and a columnar thrusted portion 106 projecting down from the forward end of the left side in the form of an inverted letter U when viewed from above the main portion 104.

The unlocking lever 103 is supported so that, with the thrusted portion 106 facing to the upper end of the cam gear 101 from the forward side, as shown in FIG. 6, the mid portion along the length of the main portion 104 is pivotally mounted to a pin 108 mounted upright on the supporting piece 107 projectedly mounted to the forward plate 44 of the frame 40. The unlocking lever 103 is perpetually biased to be turned clockwise in FIG. 2 by resilient means, not shown.

Thus, unless a thrust force tending to turn the unlocking lever 103 counterclockwise is applied to the lever 103, the lever 103 is maintained at a position in which its thrusted portion 106 contacts the forward surface of the upper end of the cam gear 101. In this position, the right hand end of the thrust portion 105 faces the vicinity of the engaging piece 83c of the right side arm 83 of the locking lever 81 from the rear side, as shown by a solid line in FIG. 3.

When the disk cassette 2 is introduced to the prescribed position within the cassette holder 26, the disk cassette 2 is locked with a small space allowance with respect to the cassette holder 26, as discussed above, and the first slider 89 is moved from this position towards the right by driving means, not shown, so that the cassette holder 26 is moved to a loading end position. Simultaneously, the positioning pins 30, 30 provided to the chassis 31 are introduced into the positioning holes 11a, 11b formed in the cassette half 3 of the disk cassette 2 for positioning the disk cassette 2 relative to the reproducing section.

It will be noted that the engaging recesses 12a, 12b extremely close to the positioning holes 11a, 11b are controlled by the locking lever 81, whereby the position of the cassette half 3 locked to the cassette holder 26 with respect to the cassette holder 26 is determined, so that substantially no dimensional errors are caused in the dimension between the engaging recesses 12a, 12b and the positioning holes 11a, 11b, despite occasional dimensional errors in the cassette half 3. Therefore, with the disk cassette 2 locked to the cassette holder 26, the positioning holes 11a, 11b and the positioning pins 30a, 30b are correctly positioned on the same axis so that the positioning pins 30a, 30b may be introduced smoothly into the positioning holes 11a, 11b. Substantially simultaneously, the center of the disk 19 is placed on the disk table 24, while the suction plate 21 is attracted by a magnet 34 provided to the disk table 24, so that the disk 19 is mounted to the disk table 24.

When the reproducing operation is started from this state, the optical disk 19 is revolved integrally with the disk table 24, at the same time that the optical pickup device 25 is moved to a position facing to a position on the signal recording area of the signal recording surface where the signals to be read are recorded. The laser beam emitted from the object lens 37 is irradiated on the signal recording surface, with the return beam being read by a reader provided to the optical block 35. For recording the information signals on the optical disk 19, the optical pickup device 25 is shifted to a position facing a position of the recording area of the signal recording surface of the optical disk 19 where the recording is to be made, similarly to the reproducing operation. A laser beam emanating from the object lens 37 of the optical pickup device 25, which is at a higher level than the output level at the time of signal reproduction, is irradiated on the signal recording surface for recording. When the operation of taking out the optical disk 2 is started from the state in which the cassette holder 26 is at the loading end position, the first slider 89 is shifted towards the left, while the cassette holder 26 is returned to the eject position. The cam gear 101 performs nearly one complete revolution counterclockwise in FIG. 6 at a predetermined timing. The thrust surface 102a of the cam projection 102 provided to the cam gear 101 thrusts the thrusted portion 106 of the unlocking lever 103 substantially forwardly and obliquely towards right.

At this time, the unlocking lever 103 is turned counterclockwise, as indicated by the double dotted chain line in FIG. 3, for thrusting the engaging member 83c of the other arm 83 of the lock lever 81 towards the right in FIG. 3, the thrust portion 105 of which is at the locking position, so that the locking lever 81 is returned to the non-locking position. It is noted that, when the lock lever 81 is at the locking position, the engaging member 83c approaches the thrust portion 105 of the unlocking lever 103 from the rear side.

Thus the engaging members 85, 85 of the locking lever 81 are drawn downwards away from the engaging recesses 12a, 12b of the cassette half 3 of the optical disk cassette 2, for releasing the locking of the disk cassette 2 by the locking lever 81. After the locking is released, the shutter opening levers 28a, 28b, so far kept in the opening end position against the force of the springs 71, 71, are shifted to a stand-by position to thrust the disk cassette 2 forward.

The disk cassette 2 is now protruded by about a half length out of the cassette inlet 23.

A modified embodiment of the recording/reproducing device pertaining to the present invention will be explained by referring to FIGS. 10 and 11.

In these figures, the present invention is shown to be applied to an optical disk player. In distinction from the disk player of the preceding embodiment wherein the disk cassette is locked to the cassette holder with the aid of the engaging recess formed in the cassette half of the disk cassette, the disk player of the present embodiment is so designed that the locking is performed with the aid of the positioning holes provided in the cassette half of the disk cassette. Therefore, only the essential portions are shown in FIGS. 10 and 11, wherein the same numerals are used to depict the components of the preceding embodiment and only the points distinct from the preceding embodiment will be explained.

Figure 10C:
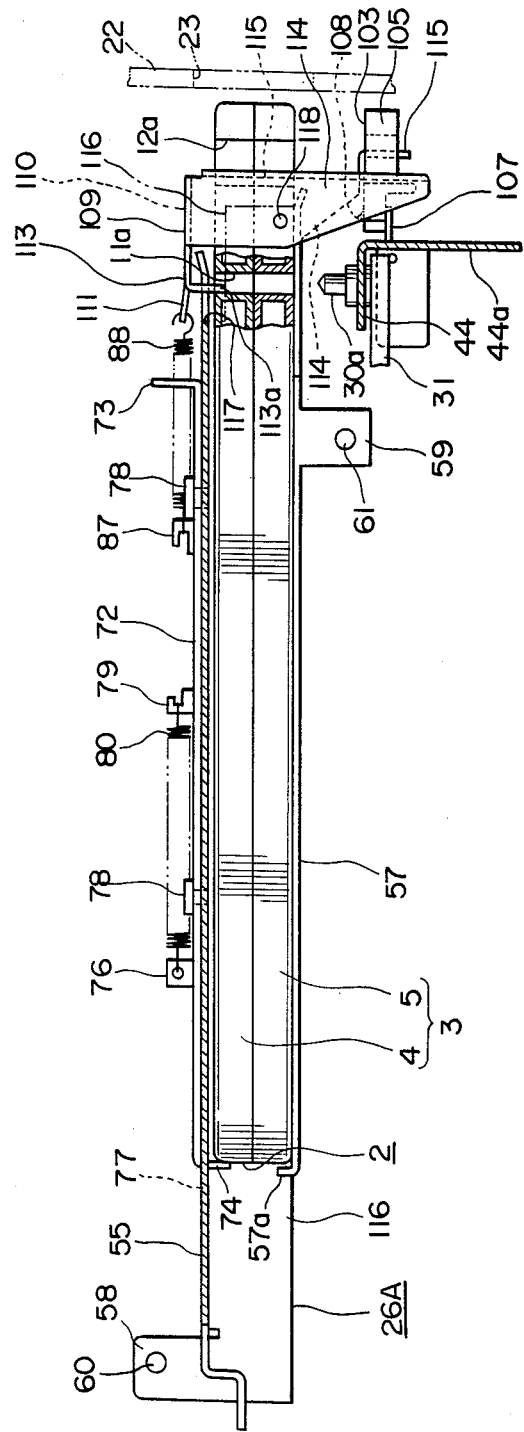
FIG. 10C is a side view showing essential parts of the other side of the optical disk player and showing the state in which the engaging member of the lock lever is engaged in the engaging recess of the disk cassette introduced into the cassette holder.
Figure 11:
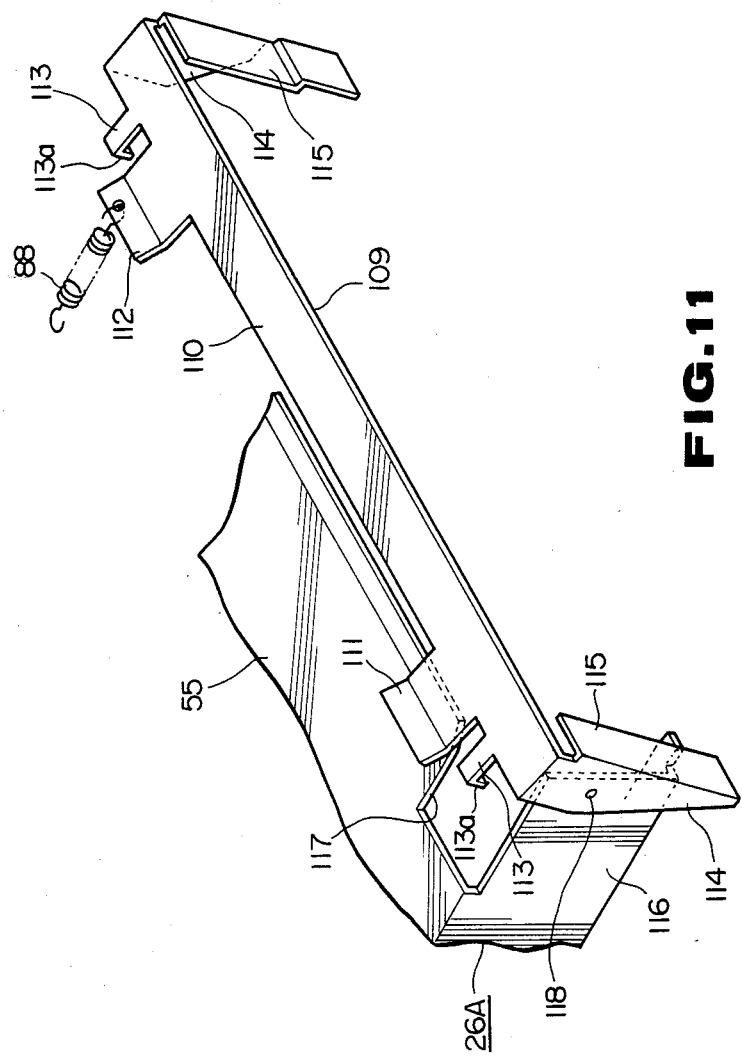
FIG. 11 is a perspective view of a lock lever employed in the above optical disk player.

The lock lever 109 employed in the optical disk player shown in FIGS. 10 and 11 is formed in the shape of an inverted letter U elongated in the left and right direction when viewed in the forward and backward direction.

The lock lever 109 has a connecting rod 110 formed as an elongated plate extending in the left and right direction and having a size about equal to that of the main portion 82 of the lock lever 81. An abutment member 111 and a spring retainer 112 are projected towards the rear from the left and right ends of the connecting rod 110, with the rear ends thereof being curved slightly upwardly. Engaging pieces 113, 113 are projected towards the rear from the positions directly to the left of the abutment member 111 and to the right of the spring retainer 112, while engaging portions 113a, 113a are formed at the rear ends of the engaging pieces 113, 113 so as to be curved downwards.

From the left and right ends of the connecting rod 110, there are downwardly extending arms 114, 114, and bent pieces 115, 115 projecting from the forward edges towards the inside are integrally formed with these arms 114, 114.

The cassette holder 26A has substantially the same construction as that of the cassette holder 26 of the preceding embodiment. The forward ends of the left and right side walls are extended to a position slightly ahead of the forward ends of the respective side walls 56, 56 of the cassette holder 26 of the preceding embodiment.

The lock lever 109 is rotatably supported by supporting shafts 118, 118 at the forward ends of the respective side walls 116, 116 of the cassette holder 26A, at the positions towards the upper ends of the left and right arms 114, 114, with the engaging portions 113a, 113a of the engaging member 113, 113 being positioned for facing the forward ends of the recesses 117, 117 provided to the respective corners of the ceiling plate 59 of the casssette holder 26A. The forward end of the tension spring 88 is engaged with the spring retainer 112 and the abutment member 111 is provided for abutting from the forward side on the stop member 73 of the stop slider 72 that is at the aforementioned forward position.

The optical disk cassette 2 is locked to the cassette holder 26A by the above described lock lever 109 in the following manner.

When the disk cassette 2 is introduced into the cassette holder 26A, the cassette half 3 abuts on the thrust member 74 of the stop slider 72. As the disk cassette is inserted further, the stop slider 72 is shifted towards the rear, whereby the stop member 73 of the stop slider 72 is receded rearwards from the abutment member 111 of the lock lever 104.

The locking lever 109 is turned counterclockwise and, as shown in FIG. 10B, the respective engaging portions 113a, 113a of the respective engaging pieces 113, 113 abut resiliently on the upper surface of the cassette half 3.

When the disk cassette 2 is introduced from this state to the prescribed position within the cassette holder 26, the positioning holes 11a, 11b formed in the cassette half 3 are positioned to face the engaging portions 113a, 113a from the lower side, whereby the locking lever 109 is further turned counterclockwise, so that, as shown in FIG. 10c, the engaging portions 113a, 113a are engaged from the upper side with the positioning holes 11a, 11b.

As a result of such engagement, the disk cassette 2 is inhibited from moving in the forward and backward direction, so that the disk cassette 2 is locked to the cassette holder 26A.

The respective engaging portions 113a, 113a are at the upper ends of the positioning holes 11a, 11b and the height of the positioning pins 30a, 30b is about half the length of the positioning holes 11a, 11b. Thus, even when the positioning pins 30a, 30b are introduced into the positioning holes 11a, 11b from the state in which the engaging portions 113a, 113a of the locking lever 109 are engaged, the engaging portions 113a, 113a do not obstruct the insertion of the positioning pins 30a, 30b. Also, even when the positioning pins 30a, 30b are introduced in the above described manner, the positioning pins do not push out the engaging portions 113a, 113a towards the top.

In the above described recording/reproducing apparatus of the present invention, the disk cassette having a cassette half is employed, in which a disk such as an optical disk, an opto-magnetic disk or the magnetic disk is accommodated and in which there are provided positioning holes opening on one or both sides along the thickness and engaging portions in proximity to a positioning holes, while positioning pins are provided to the cassette attachment unit. After the disk cassette is introduced to the predetermined inserting position, it is shifted along its thickness, whereby the positioning pins are introduced into the positioning holes for positioning the disk cassette in the cassette attachment unit. Locking means are provided so as to be rotated substantially in the same direction as the direction of the thickness of the disk cassette. Engaging portions are provided to the rotary ends and are turned substantially at the same time that the disk cassette is completely inserted so that the engaging portions are engaged in the positioning holes of the disk cassette.

Thus, according to the present invention, the disk cassette inserted in the predetermined position within the apparatus is locked at the positioning holes of the cassette half or in their vicinity, such that the position matching between the positioning holes in the disk cassette which is in the locked state by the locking means and the positioning pins provided in the cassette attachment unit may be utilized at all times with a higher accuracy, even when the cassette half size is changed for some reason, on the condition that the accurate positional disposition between the positioning pins and the engaging portion of the locking means when at the locking position is maintained. In this manner, the positioning pins may be introduced into and detached from the positioning holes in stability and without stress.

In addition, locking by the locking means is performed along the thickness of the disk cassette so that the locking means need not be provided laterally of the portion by which the disk cassette is introduced, so that the locking means may be provided with a space margin even when only a narrow space is available at the lateral side of the apparatus.

In the above embodiment, the positioning holes and the engaging portions are provided to the disk cassette. However, the present invention may also be applied when the locking is achieved with the aid of the positioning holes in cases wherein suitable engaging portions are not formed in the disk cassette.

It is not absolutely necessary that the positioning holes or the engaging portions be opened on both sides in the direction of the thickness of the cassette half or be passed through the cassette half along its thickness, but they may also be formed as recesses opened on one surface along the thickness of the cassette half.

Also, in the above embodiments, two positioning holes and two engaging portions are provided to the disk cassette, however, any other numbers of the positioning holes and engaging portions may be employed within the scope of the present invention.

Likewise, in the above embodiments, locking means are rotatably supported by the member into which the disk cassette is introduced. However, it is not absolutely necessary that the locking means be supported by the member into which the disk cassette is introduced. Thus the locking means may be supported by, for example, a chassis or a member secured to the outer casing, on the condition that the engaging portions are kept engaged with the engaging portions or with the positioning holes of the disk cassette even if the disk cassette is moved towards the cassette attachment unit. The locking means may be of any desired construction, if only the engaging portions thereof are moved in substantially the same direction as the direction of thickness of the cassette.

Although the present invention is applied to the optical disk player in the above embodiments, the present invention is not limited to these embodiments but may also be applied to a variety of recording/reproducing apparatus wherein a disk cassette having a cassette half in which the disk is accommodated is employed, in which the positioning holes are provided for opening on one or both sides of the cassette half along the thickness and the engaging portions are formed in proximity to these positioning holes, and wherein the positioning pins are provided to the cassette attachment unit and adapted to be introduced into the positioning holes for positioning the disk cassette in the cassette attachment unit by shifting the disk cassette along the thickness after insertion to the predetermined position for inserting the positioning pins into the positioning holes.

We claim as our invention:

1. Positioning apparatus for a disk cassette comprising
    a disk cassette rotatably accommodating a disk-like recording medium and having positioning holes at least on one flat surface thereof,
    a holder holding said disk cassette and being vertically movable so as to cause said disk cassette to take selectively a first position in which said disk-like recording medium is attached to rotational disk drive means or a second position spaced above said first position,
    means for shifting said holder between said first position and said second position, and
    means for engaging with said positioning holes in said disk cassette when said holder is in said first position for positioning said disk cassette,
    and further comprising locking means mounted, on said holder for rotation along a lateral wall of said disk cassette, said locking means being rotated substantially simultaneously with termination of insertion of said disk cassette into said holder for retaining said disk cassette in the vicinity of said positioning holes of said disk cassette and locking said disk cassette relative to said holder.

2. The apparatus according to claim 1 wherein said disk cassette includes a mating engaging portion formed in the vicinity of said means for shifting for engagement by said locking means for locking said disk cassette.

3. The apparatus according to claim 2 wherein said mating engaging portion is formed as a cut-out from one flat surface to the other through the thickness of said disk cassette in the lateral wall of said disk cassette.

4. The apparatus according to claim 1 wherein said positioning holes are formed on both flat surfaces of said disk cassette adjacent the lateral walls of said disk cassette.

5. The apparatus according to claim 4 wherein said locking means are adapted to engage with said positioning hole formed on the flat surface of said disk cassette that is adjacent said means for shifting for locking said disk cassette.

6. The apparatus according to claim 1 further comprising unlocking means driven by said means for shifting for releasing the locking by said locking means when said hole is shifted by said means for shifting from said first position to said second position.

7. Positioning apparatus for a disk cassette comprising:
    a disk cassette rotatably accommodating a disklike recording medium and having positioning holes at least on one flat surface thereof,
    a holder holding said disk cassette and being vertically movable so as to cause said disk cassette to take selectively a first position in which said disklike recording medium is attached to rotational disk drive means or a second position spaced above said first position,
    means for shifting said holder between said first position and said second position, and
    means for engaging with said positioning holes in said disk cassette when said holder is in said first position for positioning said disk cassette,
    and further comprising locking means mounted for rotation along a lateral wall of said disk cassette, said locking means being rotated substantially simultaneously with termination of insertion of said disk cassette into said holder for retaining said disk cassette in the vicinity of said positioning holes of said disk cassette and locking said disk cassette relative to said holder;
    said disk cassette including a mating engaging portion formed in the vicinity of said means for shifting for engagement by said locking means for locking said disk cassette;
    wherein said locking means includes a sliding member slidably mounted on said holder for sliding upon insertion of said disk cassette into said holder and a locking member rotated by said sliding member and provided with an abutment portion adapted to be turned by said sliding member, said sliding member having a mating abutment portion engaging with said abutment portion.

8. The apparatus according to claim 7 wherein said locking member is rotated by said sliding member sliding upon insertion of said disk cassette into said holder for causing said engaging portion to be engaged with said mating engaging portion.

9. The apparatus according to claim 8 wherein said locking member is biased in a direction of engaging with said mating abutment portion by biasing means.

10. The apparatus according to claim 9 wherein said locking member includes means for rotatably mounting said locking member on said holder.

11. Positioning apparatus for a disk cassette comprising:
    a disk cassette rotatably accommodating a disk-like recording medium and having positioning holes at least on one flat surface thereof,
    a holder holding said disk cassette and being vertically movable so as to cause said disk cassette to take selectively a first position in which said disklike recording medium is attached to rotational disk drive means or a second position spaced above said first position,
    means for shifting said holder between said first position and said second position, and
    means for engaging with said positioning holes in said disk cassette when said holder is in said first position for positioning said disk cassette,
    and further comprising locking means mounted for rotation along a lateral wall of said disk cassette, said locking means being rotated substantially simultaneously with termination of insertion of said disk cassette into said holder for retaining said disk cassette in the vicinity of said positioning holes of said disk cassette and locking said disk cassette relative to said holder;

said positioning holes being formed on both flat surfaces of said disk cassette adjacent the lateral walls of said disk cassette;

said locking means being adapted to engage with said positioning hole formed on the flat surface of said disk cassette that is adjacent said means for shifting for locking said disk cassette;

wherein said locking means includes a sliding member slidably mounted on said holder for sliding movement upon insertion of said disk cassette into said holder and a locking member adapted to be turned by said sliding member and having an engaging portion engaging with the positioning hole that is formed on the surface facing away from said means for shifting.

12. The apparatus according to claim 11 wherein said locking means is adapted to be rotated by said sliding movement of said sliding member upon insertion of said disk cassette into said holder, said engaging portion engaging with the positioning hole that is formed on the flat surface facing away from said means for shifting.

13. The apparatus according to claim 12 wherein said locking member is urged by urging means in a direction in which said engaging portion is engaged with said positioning hole on the flat surface of said disk cassette that is facing away from said means for shifting.

14. The apparatus according to claim 13 wherein said locking member is rotatably mounted on said holder and said holder has a recess by which said engaging portion is engaged with said positioning hole on the flat surface of said disk cassette that is facing away from said means for shifting.

* * * * *

UNITED STATES PATENT AND TRADEMARK OFFICE
CERTIFICATE OF CORRECTION

PATENT NO. : 4,918,553

DATED : April 17, 1990

INVENTOR(S) : Masayuki Suzuki

It is certified that error appears in the above-identified patent and that said Letters Patent is hereby corrected as shown below:

Col. 6, line 43, change "U shaped" to

--U-shaped--

Col. 19, line 38, after "mounted" delete ","

Col. 20, line 3, change "disklike" to --disk-like--

Signed and Sealed this

Seventeenth Day of March, 1992

*Attest:*

HARRY F. MANBECK, JR.

*Attesting Officer*     *Commissioner of Patents and Trademarks*